(12) United States Patent
Forster (10) Patent No.: US 12,282,817 B2
(45) Date of Patent: Apr. 22, 2025

(54) METAL DETECTOR RESISTANT RFID TAGS

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 362 days.

(21) Appl. No.: 17/758,109

(22) PCT Filed: Dec. 28, 2020

(86) PCT No.: PCT/US2020/067115
§ 371 (c)(1),
(2) Date: Jun. 28, 2022

(87) PCT Pub. No.: WO2021/138237
PCT Pub. Date: Jul. 8, 2021

(65) Prior Publication Data
US 2023/0043210 A1    Feb. 9, 2023

Related U.S. Application Data

(60) Provisional application No. 62/954,909, filed on Dec. 30, 2019.

(51) Int. Cl.
*G06K 19/077*     (2006.01)

(52) U.S. Cl.
CPC . *G06K 19/07758* (2013.01); *G06K 19/07786* (2013.01)

(58) Field of Classification Search
CPC ....... G06K 19/07758; G06K 19/07786; G06K 19/0726; H01Q 1/2225; H01Q 9/26; H01Q 9/285
See application file for complete search history.

(56) References Cited

U.S. PATENT DOCUMENTS

| D383,465 S | 9/1997 | Chen |
| 5,724,244 A | 3/1998 | Yabuki |

(Continued)

FOREIGN PATENT DOCUMENTS

| CN | 1926718 | 3/2007 |
| CN | 1954462 | 4/2007 |

(Continued)

OTHER PUBLICATIONS

International Preliminary Report on Patentability dated Jul. 5, 2022 issued in corresponding IA No. PCT/US2020/067115 filed Dec. 28, 2020.

(Continued)

*Primary Examiner* — Thien M Le (57) ABSTRACT

A conductive structure for use with a RFID device having a metallic mass that is below a standard detection threshold of a metal detector and a method of manufacturing the same is disclosed herein. The conductive structure preferably comprises a pair of dipole arms extending from a tuning loop, wherein each of the pair of dipole arms terminates in a load end. The conductive structure may be manufactured from a printed metallic ink, or by cutting, lasering, or etching a metal foil. The conductive structure is modified to reduce overall thickness and metallic mass of the device as much as possible, while still maintaining an acceptable level of performance. Portions of the load ends may also be hollowed out to further reduce the conductive structure's metallic mass.

18 Claims, 6 Drawing Sheets

(56) References Cited

U.S. PATENT DOCUMENTS

| | | |
|---|---|---|
| 6,142,381 A | 11/2000 | Finn et al. |
| 6,924,688 B1 | 8/2005 | Beigel |
| 6,975,834 B1 | 12/2005 | Forster |
| 7,214,569 B2 | 5/2007 | Swindlehurst et al. |
| D546,819 S | 7/2007 | Oliver |
| D553,124 S | 10/2007 | Joughin et al. |
| 7,471,173 B2 | 12/2008 | Hidaka et al. |
| 7,500,610 B1 | 3/2009 | Hadley et al. |
| 7,535,366 B2 | 5/2009 | Egbert et al. |
| D634,738 S | 3/2011 | Lim et al. |
| 8,179,329 B2 | 5/2012 | Kato |
| 8,289,165 B2 | 10/2012 | Forster |
| 8,473,235 B2 | 6/2013 | Kittel et al. |
| 8,511,569 B1 | 8/2013 | Koepp et al. |
| D697,900 S | 1/2014 | Yang et al. |
| D716,774 S | 11/2014 | Forster et al. |
| 9,070,563 B2 | 6/2015 | Yamazaki et al. |
| 9,378,451 B2 | 6/2016 | Forster |
| 9,418,262 B1 | 8/2016 | Gentile et al. |
| 9,595,211 B2 | 3/2017 | Lim et al. |
| D809,489 S | 2/2018 | Burkholder et al. |
| D812,045 S | 3/2018 | Howard |
| D826,220 S | 8/2018 | He |
| D837,769 S | 1/2019 | Yang |
| 10,186,765 B2 | 1/2019 | Coleman et al. |
| 10,243,255 B2 | 3/2019 | Rokhsaz et al. |
| 10,268,945 B1 | 4/2019 | Keller et al. |
| 10,311,355 B1 | 6/2019 | Hahn et al. |
| D855,039 S | 7/2019 | Naweed |
| D880,460 S | 4/2020 | Forster |
| 10,665,922 B2 | 5/2020 | Takahashi et al. |
| 10,846,585 B1 | 11/2020 | Keller et al. |
| 2002/0157411 A1 | 10/2002 | Ishikawa et al. |
| 2004/0089707 A1 | 5/2004 | de Cortina et al. |
| 2004/0238534 A1 | 12/2004 | Mast |
| 2005/0001785 A1 | 1/2005 | Ferguson et al. |
| 2005/0091996 A1 | 5/2005 | Ishikawa et al. |
| 2005/0134519 A1 | 6/2005 | Fukano et al. |
| 2005/0186902 A1 | 8/2005 | Lieffort et al. |
| 2006/0007004 A1 | 1/2006 | Altwasser |
| 2006/0017571 A1 | 1/2006 | Arnold et al. |
| 2006/0043198 A1 | 3/2006 | Forster |
| 2006/0044192 A1 | 3/2006 | Egbert |
| 2006/0054710 A1 | 3/2006 | Forster et al. |
| 2006/0145869 A1 | 7/2006 | Appalucci et al. |
| 2006/0145872 A1 | 7/2006 | Tanaka et al. |
| 2006/0158380 A1 | 7/2006 | Son et al. |
| 2007/0063057 A1 | 3/2007 | Masubuchi et al. |
| 2007/0069859 A1 | 3/2007 | Bae et al. |
| 2007/0132593 A1 | 6/2007 | Yamazaki |
| 2007/0152829 A1 | 7/2007 | Lindsay et al. |
| 2007/0164859 A1 | 7/2007 | Cobianu et al. |
| 2007/0171129 A1 | 7/2007 | Coleman et al. |
| 2007/0194935 A1 | 8/2007 | Ayala et al. |
| 2007/0200711 A1 | 8/2007 | Kai et al. |
| 2007/0200782 A1 | 8/2007 | Hayama et al. |
| 2007/0238245 A1 | 10/2007 | Cote et al. |
| 2007/0290859 A1 | 12/2007 | Held et al. |
| 2008/0018473 A1 | 1/2008 | Tsai et al. |
| 2008/0036608 A1 | 2/2008 | Sakama |
| 2008/0105673 A1 | 5/2008 | Ikeda et al. |
| 2008/0122631 A1 | 5/2008 | Kodukula et al. |
| 2008/0143480 A1 | 6/2008 | Egbert et al. |
| 2008/0220721 A1 | 9/2008 | Downie et al. |
| 2009/0109002 A1 | 4/2009 | Hadley et al. |
| 2009/0179817 A1 | 7/2009 | Yin |
| 2009/0236334 A1 | 9/2009 | Ben-Shmuel et al. |
| 2009/0266900 A1 | 10/2009 | Ikemoto et al. |
| 2009/0309703 A1 | 12/2009 | Forster |
| 2010/0000980 A1 | 1/2010 | Popescu |
| 2010/0001079 A1 | 1/2010 | Martin et al. |
| 2010/0105235 A1* | 4/2010 | Friedrich ............. H01R 13/622 439/321 |
| 2010/0117819 A1 | 5/2010 | Murray |
| 2010/0141452 A1 | 6/2010 | Lian et al. |
| 2010/0188306 A1 | 7/2010 | Kitayoshi et al. |
| 2010/0213187 A1 | 8/2010 | Bandholz et al. |
| 2010/0230500 A1 | 9/2010 | Wilkinson |
| 2010/0302013 A1 | 12/2010 | Kato et al. |
| 2011/0025466 A1 | 2/2011 | Stone |
| 2011/0133904 A1 | 6/2011 | Warther |
| 2011/0147467 A1 | 6/2011 | Choi |
| 2011/0253975 A1 | 10/2011 | Kato |
| 2012/0038461 A1 | 2/2012 | Forster |
| 2012/0061473 A1 | 3/2012 | Forster et al. |
| 2012/0062367 A1 | 3/2012 | Warther |
| 2012/0111950 A1 | 5/2012 | Worrall et al. |
| 2012/0132718 A1 | 5/2012 | Manzi |
| 2013/0002404 A1 | 1/2013 | Takeoka et al. |
| 2013/0016025 A1 | 1/2013 | Burke et al. |
| 2013/0087625 A1 | 4/2013 | Kato |
| 2013/0270348 A1 | 10/2013 | Zenz et al. |
| 2013/0293333 A1 | 11/2013 | Vemagiri et al. |
| 2013/0299583 A1 | 11/2013 | Wilkinson |
| 2013/0306626 A1 | 11/2013 | Torres et al. |
| 2013/0313328 A1 | 11/2013 | Mohajer-Iravani et al. |
| 2014/0034739 A1 | 2/2014 | Forster et al. |
| 2014/0077933 A1 | 3/2014 | Yang et al. |
| 2015/0076238 A1 | 3/2015 | Koskelainen |
| 2015/0144702 A1 | 5/2015 | Mei et al. |
| 2015/0255994 A1* | 9/2015 | Kesler ................. B60L 53/124 307/10.1 |
| 2016/0003895 A1 | 1/2016 | Farr et al. |
| 2016/0189021 A1 | 6/2016 | Forster |
| 2016/0345389 A1 | 11/2016 | Torres et al. |
| 2017/0214142 A1 | 8/2017 | Rokhsaz et al. |
| 2018/0075506 A1* | 3/2018 | Burkhard ............... B65G 23/23 |
| 2018/0089551 A1 | 3/2018 | Orihara et al. |
| 2018/0092486 A1 | 4/2018 | Kwon et al. |
| 2018/0189623 A1 | 7/2018 | Forster et al. |
| 2018/0340991 A1 | 11/2018 | Mett et al. |
| 2019/0261887 A1* | 8/2019 | Potze ..................... A61B 5/055 |
| 2019/0276241 A1* | 9/2019 | Royce ............. G05B 19/41865 |
| 2019/0325282 A1 | 10/2019 | Forster et al. |
| 2020/0005110 A1 | 1/2020 | Forster |
| 2020/0154727 A1* | 5/2020 | Celli ......................... A23F 5/10 |
| 2020/0160005 A1 | 5/2020 | Volpi et al. |
| 2020/0176877 A1* | 6/2020 | Kim ..................... H01Q 21/24 |
| 2020/0372314 A1* | 11/2020 | Shimai ..................... H01Q 1/38 |
| 2021/0260451 A1* | 8/2021 | Belton ................. A63B 57/405 |
| 2021/0405135 A1* | 12/2021 | Edgley ............. G01R 33/3815 |
| 2022/0013014 A1* | 1/2022 | Xu ..................... G01C 21/3691 |
| 2022/0335763 A1* | 10/2022 | Bohm ..................... G01V 3/12 |

FOREIGN PATENT DOCUMENTS

| | | |
|---|---|---|
| CN | 101051353 | 10/2007 |
| CN | 101053115 | 10/2007 |
| CN | 101090175 | 12/2007 |
| CN | 101107638 | 1/2008 |
| CN | 101467163 | 6/2009 |
| CN | 101896922 | 11/2010 |
| CN | 102119395 | 7/2011 |
| CN | 102521645 | 6/2012 |
| CN | 102542325 | 7/2012 |
| CN | 102947093 | 2/2013 |
| CN | 103154976 | 6/2013 |
| CN | 103377395 | 10/2013 |
| CN | 104541316 | 4/2015 |
| CN | 104685706 | 6/2015 |
| CN | 107257981 | 10/2017 |
| CN | 207424902 U | 5/2018 |
| CN | 208423178 U | 1/2019 |
| CN | 109389203 | 2/2019 |
| CN | 110140132 | 8/2019 |
| DE | 102008054711 | 6/2009 |
| EP | 1174667 | 1/2002 |
| EP | 1479619 | 11/2004 |
| EP | 2306588 | 4/2011 |
| EP | 3828771 | 6/2021 |
| GB | 1592978 | 7/1981 |
| GB | 2554952 | 4/2018 |
| JP | 8-291914 | 11/1996 |
| JP | 2000-090637 | 3/2000 |

(56) References Cited

FOREIGN PATENT DOCUMENTS

| | | |
|---|---|---|
| JP | 2000-163543 | 6/2000 |
| JP | 2001-143043 | 5/2001 |
| JP | 2001-317741 | 11/2001 |
| JP | 2001-326526 | 11/2001 |
| JP | 2002-049905 | 2/2002 |
| JP | 2002-150248 | 5/2002 |
| JP | 2003-030612 | 1/2003 |
| JP | 2003-087044 | 3/2003 |
| JP | 2003-513381 | 4/2003 |
| JP | 2005-101987 | 4/2005 |
| JP | 2005-102185 | 4/2005 |
| JP | 2005-119745 | 5/2005 |
| JP | 2005-216044 | 8/2005 |
| JP | 2005-252853 | 9/2005 |
| JP | 2005-323019 | 11/2005 |
| JP | 2006-132793 | 5/2006 |
| JP | 2007-026145 | 2/2007 |
| JP | 2007-086863 | 4/2007 |
| JP | 2007-089054 | 4/2007 |
| JP | 2007/228325 | 9/2007 |
| JP | 2007-233597 | 9/2007 |
| JP | 2008-066808 | 3/2008 |
| JP | 2008-525893 | 7/2008 |
| JP | 2010-045467 | 2/2010 |
| JP | 2010-212853 | 9/2010 |
| JP | 2010-231797 | 10/2010 |
| JP | 2010-263404 | 11/2010 |
| JP | 2011-100181 | 5/2011 |
| JP | 2011-227668 | 11/2011 |
| JP | 2012-035486 | 2/2012 |
| JP | 2012-520517 | 9/2012 |
| JP | 2013-114513 | 6/2013 |
| JP | 2014-003452 | 1/2014 |
| JP | 2015-133153 | 7/2015 |
| JP | 2015-162187 | 9/2015 |
| JP | 2016-033748 | 3/2016 |
| JP | 2016-167667 | 9/2016 |
| JP | 3206091 | 9/2016 |
| JP | 2016-532901 | 10/2016 |
| JP | 2018-163643 | 10/2018 |
| JP | 2019-121933 | 7/2019 |
| TW | 200821945 | 5/2008 |
| TW | 200841251 | 10/2008 |
| WO | 02/099764 | 12/2002 |
| WO | 2002/099764 | 12/2002 |
| WO | 2005/096435 | 10/2005 |
| WO | 2006/048964 | 11/2006 |
| WO | 2008/084917 | 7/2008 |
| WO | 2009/042324 | 4/2009 |
| WO | 2009/050662 | 4/2009 |
| WO | 2009/110381 | 9/2009 |
| WO | 2010/079830 | 7/2010 |
| WO | 2011/159716 | 12/2011 |
| WO | 2012/020748 | 2/2012 |
| WO | 2014/210000 | 12/2014 |
| WO | 2017/094794 | 6/2017 |
| WO | 2017/126418 | 7/2017 |
| WO | 2018/073568 | 4/2018 |
| WO | 2018/125977 | 7/2018 |
| WO | 2019/046429 | 3/2019 |

OTHER PUBLICATIONS

International Preliminary Report on Patentability dated Jun. 28, 2022 issued in corresponding IA No. PCT/US2020/067168 filed Dec. 28, 2020.
International Search Report and Written Opinion dated Oct. 1, 2019 issued in corresponding IA No. PCT/US2019/039485 filed Jun. 27, 2019.
International Search Report and Written Opinion dated Jun. 8, 2018 issued in corresponding IA No. PCT/US2017/068659 filed Dec. 28, 2017.
International Preliminary Report on Patentability dated Jul. 11, 2019 issued in corresponding IA No. PCT/US2017/068659 filed Dec. 28, 2017.
International Preliminary Report on Patentability dated Oct. 20, 2020 issued in corresponding IA No. PCT/US2019/028281 filed Apr. 19, 2019.
International Search Report and Written Opinion dated Aug. 5, 2019 issued in corresponding IA No. PCT/US2019/028281 filed Apr. 19, 2019.
International Preliminary Report on Patentability dated Oct. 29, 2020 issued in corresponding IA No. PCT/US2019/028275 filed Apr. 19, 2019.
International Search Report and Written Opinion dated Jul. 12, 2019 issued in corresponding IA No. PCT/US2019/028275 filed Apr. 19, 2019.
International Search Report and Written Opinion dated Sep. 10, 2019 issued in corresponding IA No. PCT/US2019/028268 filed Apr. 19, 2019.
International Preliminary Report on Patentability dated Oct. 29, 2020 issued in corresponding IA No. PCT/US2019/028268 filed Apr. 19, 2019.
International Search Report and Written Opinion dated Oct. 11, 2019 issued in corresponding IA No. PCT/US2019/039460 filed Jun. 27, 2019.
International Preliminary Report on Patentability dated Dec. 29, 2020 issued in corresponding IA No. PCT/US2019/039485 filed Jun. 27, 2019.
International Preliminary Report on Patentability dated Dec. 29, 2020 issued in corresponding IA No. PCT/US2019/039460 filed Jun. 27, 2019.
International Search Report and Written Opinion dated Mar. 30, 2021 issued in corresponding IA No. PCT/US2020/067115 filed Dec. 28, 2020.
International Search Report and Written Opinion dated Mar. 31, 2021 issued in corresponding IA No. PCT/US2020/067168 filled Dec. 28, 2020.

* cited by examiner

METAL DETECTOR RESISTANT RFID TAGS

CROSS-REFERENCE TO RELATED APPLICATION

The present application is a 371 of International Application No. PCT/US2020/067115, which was published in English on Jul. 8, 2021, and claims the benefit of U.S. Provisional Patent Application No. 62/954,909 filed Dec. 30, 2019, both of which are incorporated herein by reference in their entireties.

FIELD

The present invention relates generally to metal detector-resistant tags (e.g., avoid detection or triggering of a false positive when passing through a metal detector) and methods of making and using thereof. More specifically, the modified RFID devices are intended for use with consumer food products and associated packaging that are scanned with metal detectors in order to detect metallic foreign objects that may be included therein. The modified RFID tags of the present invention are particularly well suited for direct and indirect food contact applications including, without limitation, the transportation, storage, handling and movement of the same. Accordingly, the present specification makes specific reference thereto. However, it is to be appreciated that aspects of the present invention are also equally amenable to other like applications and devices.

BACKGROUND

Radio-frequency identification is the use of electromagnetic energy to stimulate a responsive device (known as an RFID "tag" or transponder) to identify itself and, in some cases, provide additional information and/or data stored in the tag. RFID tags and/or labels typically contain a combination of antennas and analog and/or digital electronics, which may include, for example, a semiconductor device commonly referred to as the "chip", communications electronics, data memory, and control logic. Typical RFID tags have a microprocessor electrically connected to an antenna, and act as transponders, providing information stored in the chip memory in response to a radio frequency interrogation signal received from a reader, also referred to as an interrogator. In the case of passive RFID devices, the energy of the interrogation signal also provides the necessary energy to operate the RFID tag device.

RFID tags may be incorporated into or attached to articles that a user wishes to later identify and/or track, such as various food products. In some cases, the RFID tag may be attached to the outside of the article with a clip, adhesive, tape, or other means and, in other cases, the RFID tag may be inserted within the article, such as being included in the packaging, or located within the container of the article or plurality of articles. Further, RFID tags are manufactured with a unique identification number which is typically a simple serial number of a few bytes with a check digit attached. This identification number is typically incorporated into the RFID tag during its manufacture. The user cannot alter this serial/identification number, and manufacturers guarantee that each RFID tag serial number is used only once and is, therefore, unique. Such read-only RFID tags typically are permanently attached to an article to be identified and/or tracked and, once attached, the serial number of the tag is associated with its host article in a computer database.

Food product items, such as ready to consume meals or other packaged food products are commonly manufactured or prepared in factories or commercial kitchens that utilize machinery with metal components as part of the production process, and that could result in the food product becoming contaminated with metal particles. Additionally, it is possible for metal to be maliciously placed into a food product. While food manufacturers typically have very stringent environmental controls in place within their own facilities and packaging processes, metal items can break and accidentally still enter the food product or its packaging. One common low-cost method of detecting the undesirable and/or unintended metal is to pass the packaged food product through a metal detector. If metal is detected, the food product can be segregated to remove the metal contaminant from the food product, or otherwise disposed of. Unfortunately, as explained more fully below, the use of metal detectors for such purposes have a number of limitations when used with RFID devices.

More specifically, to allow for better control of shipping, traceability, inventory, and other supply chain needs, it is desirable to use RFID devices in relation to food products. RFID devices have the potential to increase profitability for a food manufacturer by allowing the food manufacturer to continuously monitor the supply of food product throughout the entire supply chain. Using RFID tags also allows the manufacturer to quickly respond to low inventory without the need for a physical inventory count to ensure an adequate supply of food product, while avoiding the risks of overstocking particular food product items. For example, a store can monitor the supply of food products on hand and easily predict when to order more food product to maintain an appropriate supply and to have food products readily available at the point of sale. Ideally, the RFID devices should therefore be attached to the food product as early as possible in the supply chain to assist in traceability and production, or integrated with the food product packaging before it is used to package the food item.

Unfortunately, the mass of conductive material used as an antenna in an RFID device is typically greater than the detection threshold for a foreign metal object of a metal detector. This deficiency requires a manufacturer to either reduce the detection threshold of the metal detector, thereby reducing its ability to detect a foreign metal object, or to apply an RFID device after scanning the food product with the metal detector, thereby losing the benefits of more accurate traceability and use of the RFID device throughout the entire manufacturing or production process.

Therefore, there exists in the art a long felt need for an improved RFID device that can be used in relation to food product items throughout the entire manufacturing or production process, including prior to scanning the food products for foreign metal objects with a metal detector. There also exists a long felt need in the art for an improved RFID device that is metal detector "resistant", and whose antenna or other metal components will not trigger a false positive from the metal detector.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

RFID devices/antenna that are below the standard detection threshold of most metal detectors commonly used in food product manufacturing and/or production, and a method of using the same are described herein. More specifically, the RFID device can be placed on the food product item or its packaging prior to being scanned by a metal detector, and will not generate a false positive based on the metallic components of the RFID device. In one embodiment, the RFID device contains an antenna structure that is designed with a metal mass below the detection threshold of the metal detector, but that still maintains an adequate level of performance to track the food product item through the supply chain including, without limitation, in a store inventory.

In some embodiments, the RFID device further contains a conductive structure. In some embodiments, the conductive structure contains a pair of dipole arms extending from a tuning loop, wherein each of said dipole arms terminates in a load end. In some embodiments, the conductive structure is further configured to have a metal mass that is less than a standard detection threshold of a metal detector that is used to scan food product items and their packaging.

In some embodiments, the conductive structure is as described above and has an area large enough to achieve a required or desired performance, but still below the typical standard detection threshold associated with scanning a food item or packaging for a foreign metal object of approximately a 1 mm diameter metal sphere.

The conductive structure may be manufactured by any techniques known in the art including, but not limited, printing a conductive ink, or by cutting (e.g., laser and/or die cutting) a metal foil. In some embodiments, a thickness of the overall conductive structure is reduced to no less than a skin depth calculated for the respective conductive structure material and frequency.

In some embodiments, portions of each load end may be hollowed out so that areas of the conductive structure having a lower current flow are removed with minimal impact on overall RFID performance, while also achieving a conductive structure with a mass below the detection threshold of the metal detector.

In further embodiments, a RFID device is disclosed that is contemplated for use with food product items, and food packaging applications. The RFID device preferably contains a RFID chip and a conductive structure electrically coupled to the RFID chip. In some embodiments, the conductive structure includes a pair of dipole arms extending oppositely from a tuning loop, wherein each of said dipole arm terminates in a load end. The conductive structure is configured to have a metal mass that is less than a standard detection threshold of a metal detector that is used to scan food product items and their respective packaging.

The improved RFID devices described herein may reduce or eliminate the sparking risks associated with using a microwave to cook a food product with an RFID device attached thereto by eliminating or removing, such as by hollowing out, a portion of the metal conductive structure of the RFID device. A similar result may also be partially accomplished by reducing the thickness of the metal conductive structure. Yet another benefit of the improved RFID devices described herein is that this reduction of structure and mass creates a RFID device that does not block detection of high-density materials if the RFID device is x-rayed.

Methods for reducing the metal mass of a conductive structure for use with a RFID device are also described herein. In some embodiments, the method includes (1) providing a conductive structure designed with an initial area just large enough to adequately perform its intended function; (2) determine a skin depth for the conductive structure based on material and/or frequency; and (3) reducing the overall thickness of the conductive structure as much as possible to maintain an adequate level of performance (preferably to the depth of the calculated skin thickness).

In some embodiments, specific areas of the conductive structure having a relatively lower current flow are then hollowed out to remove additional mass. The specific areas hollowed out are preferably located on a pair of load ends of the overall thickness of the conductive structure. In some embodiments, enough material is preferably removed so that, in combination with the reduced overall thickness, the conductive structure has a mass below the standard detection threshold of a metal detector used in food processing screening but enough mass to function effectively as a RFID device.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, one common low-cost method of detecting undesirable and/or unintended metal in a food product item or its associated packaging is to pass the food product and/or packaging through a metal detector. If metal is detected, the food product can be segregated to remove the metal contaminant from the food product, or otherwise disposed of. The use of RFID devices is also a common way of tracking food products throughout the food supply chain. Unfortunately, heretofore, RFID devices have not worked well with metal detectors and oftentimes result in the generation of false positive readings by the metal detector in response to the metallic components in the RFID device. More specifically, RFID devices typically contains antennas that are metallic and large enough to be detectable by a metal detector, thereby triggering a false positive reading and requiring an individual inspection which defeats the purpose of the metal detector. While a smaller RFID tag could be used to offset this problem, the use of smaller RFID tags oftentimes results in a significant drop in the level of performance of the RFID device, thereby defeating the purpose of the RFID device. Other options include decreasing the detector's sensitivity, which reduces the ability of the metal detector to detect smaller metal objects and is undesirable, or to apply the RFID devices to the food products after scanning for metal objects, which reduces the functionality of the RFID device because it wasn't present throughout the entire manufacturing or production process.

Accordingly, there is a long felt need in the art for an improved RFID device that can be used in relation to food product items throughout the entire manufacturing or production process, and whose antenna or other metal components will not trigger a false positive from the metal detector.

Figure 1:
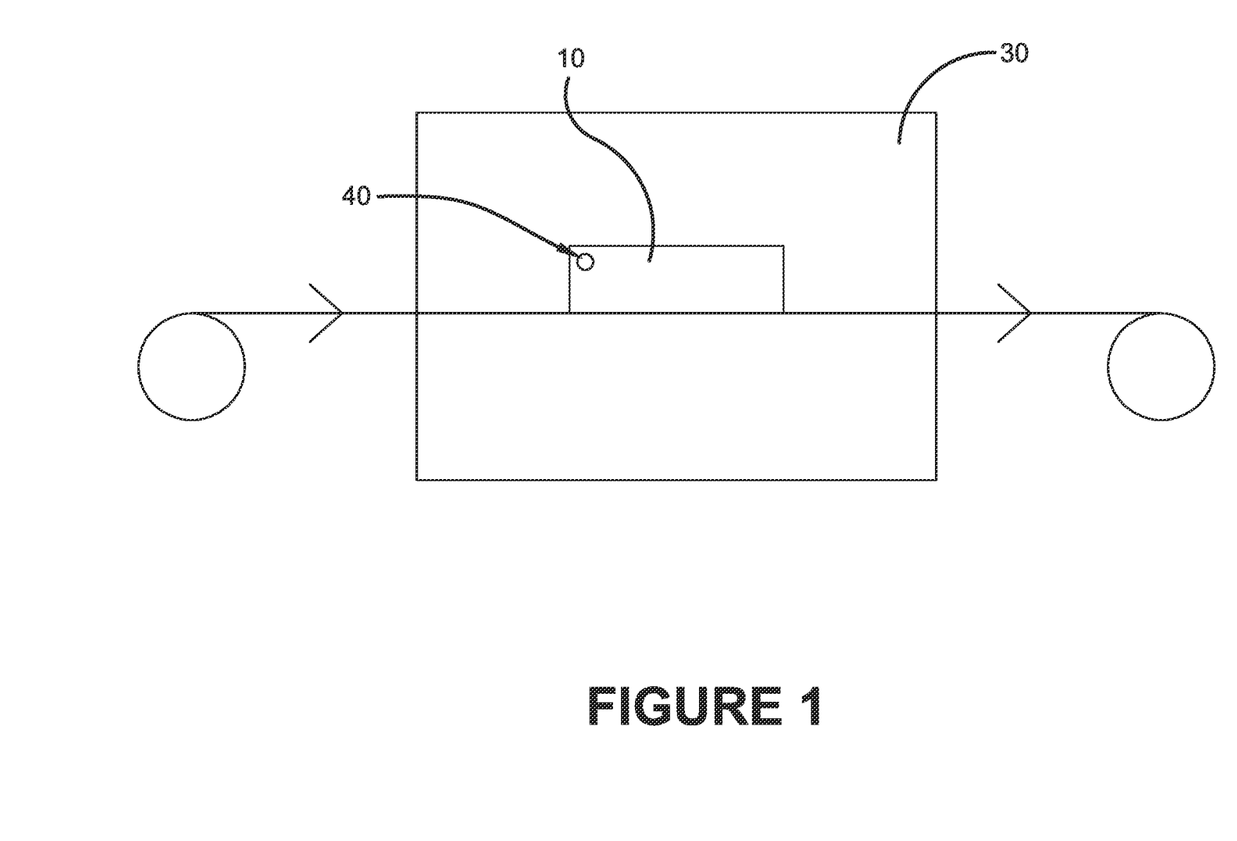
FIG. 1 illustrates a side view of a food product item being scanned by a metal detector for a foreign object in accordance with the disclosed architecture.

Referring initially to the drawings, FIG. 1 illustrates the use of a metal detector 30 for use in the food industry. More specifically, a food item 10, such as a ready to eat meal, frozen food, etc., is passed through the metal detector 30 prior to shipping. The metal detector is typically in the form of a tunnel. Metal detectors 30 used in food scanning operations are oftentimes configured with a detection threshold for metal. In the event that a detectable mass of metal 40 is detected in excess of the set detection threshold, the food item 10 may be rejected, disposed of, or diverted to a separate production or inspection area for further investigation into the source of the metal detection. While this outcome is desirable in the event that the food product item 10 has metal contamination, false positive detections result in manufacturing/production delays, and the need for human intervention, neither of which are efficient or desirable.

Figure 2:
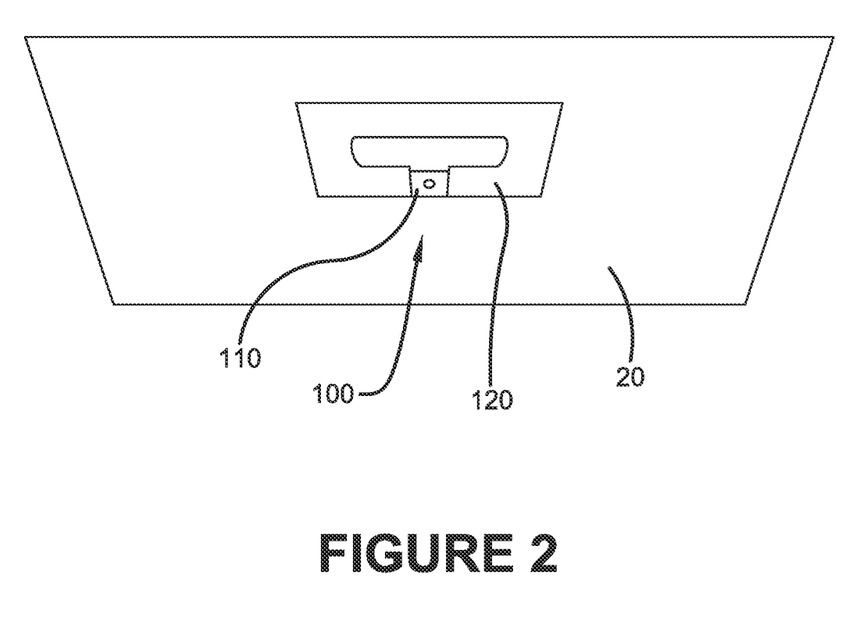
FIG. 2 illustrates a side perspective view of a RFID device attached to a food packaging in accordance with the disclosed architecture.

FIG. 2 illustrates a side perspective view of a RFID device 100 containing a RFIF chip 110 and a conductive structure 120. The RFID device 100 is attached to a food product packaging 20 in accordance with the disclosed architecture, though it is also contemplated that RFID device 100 may be directly attachable to the food product item 10. Typical applications for attaching the RFID device 100 to food product item 10 or its associated packaging 20 include food product traceability, where the RFID device 100 is used in conjunction with a database for storing information, for example, to record exactly where and when the food product item 10 was produced, the identity of the source of the food product item 10, to associate the food product item 10 with its raw ingredients, to track the food product item 10 expiration or the "best by" dates, and any other trackable element that suits user need and/or preference. The food product packaging 20 may be microwavable or freezable depending on the requirements of the enclosed food product item 10.

Figure 3A:
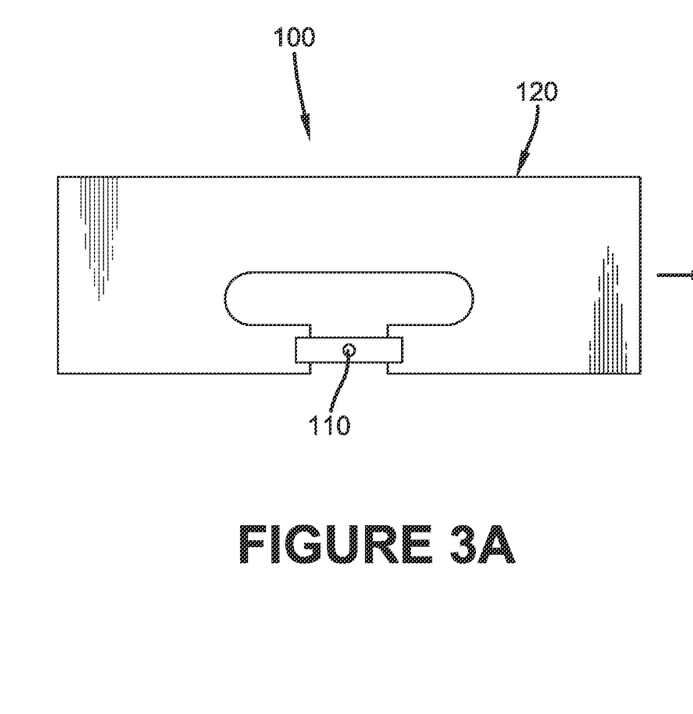
FIG. 3A illustrates a top view of an RFID device prior to removing portions of a conductive structure of the RFID device in accordance with the disclosed architecture.
Figure 3B:
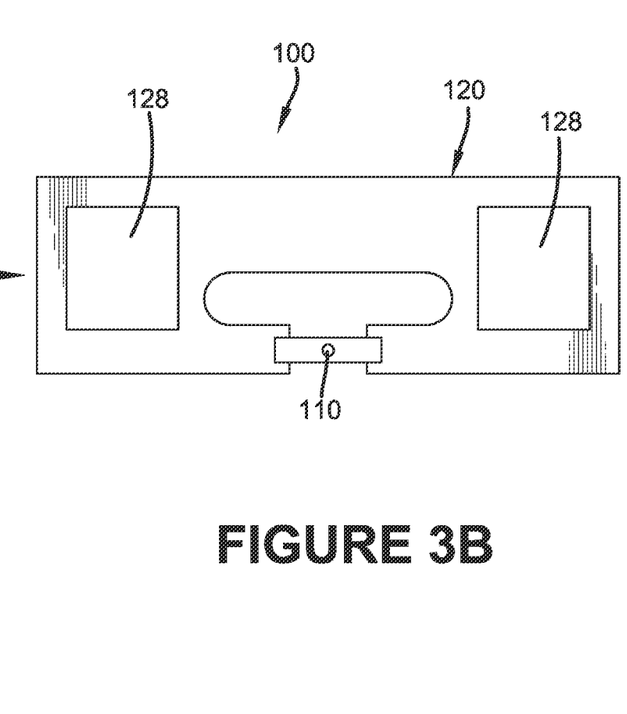
FIG. 3B illustrates a top view of the RFID device of FIG. 3A after removing portions of the conductive structure of the RFID device in accordance with the disclosed architecture.

FIG. 3A illustrates a top view of RFID device 100, which contains an RFID chip 110 and conductive structure 120. More specifically, RFID chip 110 is electrically coupled to conductive structure 120. However, the mass of the metal of conductive structure 120 of RFID device 100 will likely trigger a false positive in a metal detector, such as metal detector 30 shown in FIG. 1. By comparison, FIG. 3B illustrates a top view of the RFID device 100 of FIG. 3A but after removing portions of the conductive structure 120 of the RFID device in accordance with the disclosed architecture. More specifically, the RFID device 100 of FIG. 3 also contains a RFID chip 110 electrically coupled to a metallic conductive structure 120, but wherein a plurality of portions 128 of conductive structure 120 have been removed to reduce the overall metallic mass of the RFID device 100 without affecting its overall performance (i.e., to be successfully interrogated by an RFID reader (not shown) throughout the food product supply chain). The portions 128 of conductive structure 120 to be removed or hollowed out are chosen based on where the current flow through conductive structure 120 is relatively low compared to the rest of the conductive structure 120, and such that the result of the removal of portions 128 does not significantly affect performance of the RFID device 100. While this reduction in material is beneficial, other adjustments or other aspects of the RFID device 100 design may be required to provide optimal sensitivity.

Figure 4A:
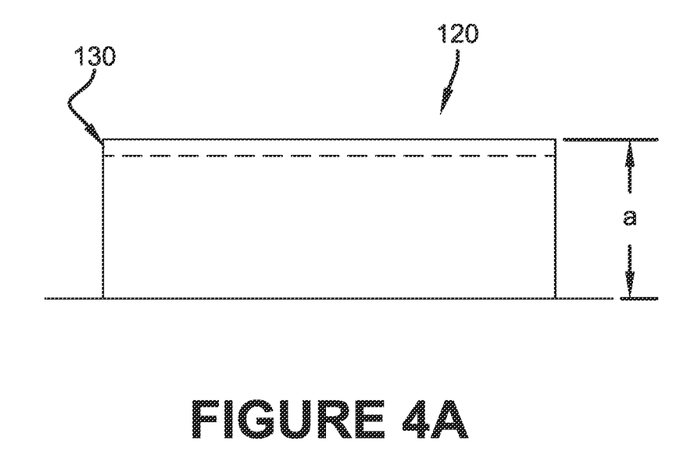
FIG. 4A illustrates a side elevational view the conductive structure having a starting thickness in accordance with the disclosed architecture.
Figure 4B:
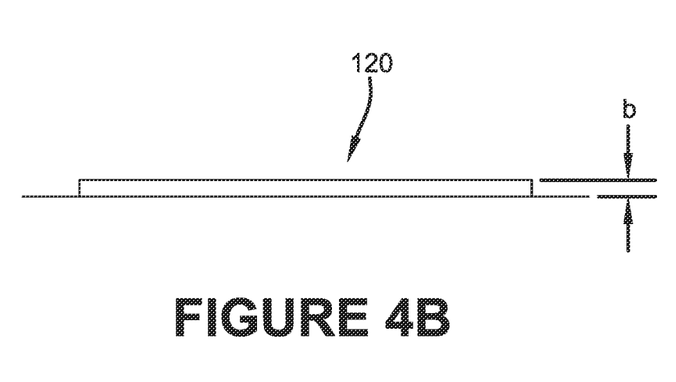
FIG. 4B illustrates a side elevational view the conductive structure having a reduced thickness in accordance with the disclosed architecture.

In further embodiments, as illustrated in FIGS. 4A and 4B, the metal mass of the conductive structure 120 may also be reduced by reducing the thickness of either all or part of the conductive structure 120. More specifically, the conductive structure 120 illustrated in FIG. 4A has an initial thickness (a). It is known to those of ordinary skill in the art that RF currents in the ultra-high frequency (UHF) frequency range in the region of 915 MHz flow primarily on the surface of the conductor or antenna. Additionally, said currents reduce exponentially with the depth of the conductor. An expression of this current reducing effect is known as skin depth, and the conductive structure 120 of FIG. 4A has a skin depth 130, as explained more fully below.

As best illustrated in FIGS. 4A and 4B, another way of reducing the overall metallic mass of the conductive structure 120 is to decrease the initial thickness (a) (as shown in FIG. 4A) to a reduced thickness (b) (as shown in FIG. 4B). In some embodiments, reduced thickness (b) is at least the thickness of skin depth 130. More specifically, skin depth 130 is a measure of the current density, and is defined as the distances from the outer edges of a conductor to the point at which the current density falls to 1/e of the value of the current at the surface of the conductor. For example, in a layer four times the skin depth from the surface of a conductor, approximately 98% of the current will flow in the conductor. In a further example, for a UHF RFID antenna made from aluminum, skin depth, based on a resistivity of $2.65 \times 10^{-8}$ ohm-meter and a frequency of 915 MHz, is calculated as 2.7 μm. Therefore, as a rectangular cross-section conductor, once thickness drops below 5.4 μm, the resistance at 915 MHz increases above the DC resistance, introducing additional loss and reduction of antenna and hence RFID device performance.

A number of approaches may be taken to reduce the metallic mass of the conductive structure 120 to overcome the limitations of the prior art. For example, the selection of a RFID device with a relatively small antenna having a metal mass that is below the detection threshold of the metal detector and therefore, would not trigger a detection may be considered. However, RFID devices with reduced or relatively small RFID antenna sizes are commonly associated with lower and unacceptable RF performance.

Figure 5A:
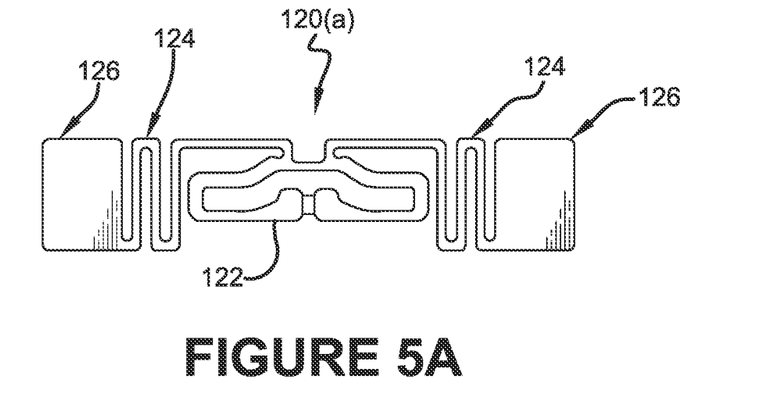
FIG. 5A illustrates a top view of an RFID device having an initial conductive structure in accordance with the disclosed architecture.
Figure 5B:
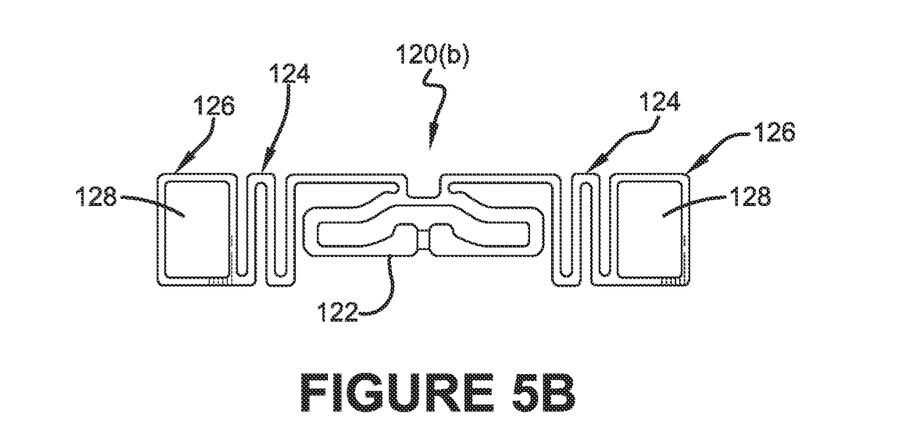
FIG. 5B illustrates a top view of the RFID device having a modified conductive structure in accordance with the disclosed architecture

FIG. 5A illustrates a top view of an RFID device 100 having an initial conductive structure 120 (a), and FIG. 5B illustrates a top view of the RFID device 100 having a modified conductive structure 120 (b) in accordance with the disclosed architecture. More specifically and as illustrated in FIG. 5A, the conductive structure in an initial unmodified configuration 120 (a) may be a dipole type antenna, such as an AD238 RFID tag manufactured and sold by Avery Dennison, of Glendale, California. However, the example is used for exemplary purposes only, as many different initial unmodified RFID tags designs that may be used in relation to food production are contemplated herein. In some embodiments, the conductive structure 120 (a) contains a tuning loop 122, and a pair of dipole arms 124 each extending from the tuning loop 122 in generally opposite directions. More specifically, each of the dipole arms 124 may be meander-line type arms that each terminate in a load end 126. Each load end 126 is an area of top load for the conductive structure 120, which strengthens broadband.

A standard detection threshold for a detectable mass 40 (as shown in FIG. 1) for a metal detector 30 (also shown in FIG. 1) of the type commonly used in the food production industry is a sphere approximately 1 mm in diameter. In the present example, which utilizes an AD238 RFID tag, the material used for the conductive structure 120 is aluminum and the volume of the detection threshold is approximately 0.52 $mm^3$. Therefore, the standard detection threshold in this example has a total metallic volume of 0.52 $mm^3$ or greater. The unmodified conductive structure 120 (a) made with a starting thickness of 15 μm aluminum has a volume of approximately 8.6 $mm^3$, and an area of 573 $mm^2$, which is well above the detection threshold and would likely result in a false positive by metal detector 30. However, reducing the conductive structure 120 from the starting thickness to a reduced thickness of 1 μm will reduce the volume of the conductive structure 120 to approximately 0.57 $mm^3$, which is much close to the detection threshold and does not change the overall conductive structure area. Unfortunately, the reduced thickness of 1 μm is less than a skin depth 130 of the aluminum, so a reduction in RF performance should be expected.

By comparison, FIG. 5B illustrates the result of a modification to the antenna design that results in a reduced overall metallic mass, while still maintaining an acceptable level of performance. The modified conductive structure 120 (b) has a mass below the standard detection threshold of metal detector 30. More specifically, the overall conductive structure 120 (b) ideally has a thickness greater than the skin depth 130 for the constructive material and frequency. In this example, the skin depth 130 for aluminum at a frequency of 915 MHz is approximately 2.7 μm.

To achieve the desired level of performance from RFID device 100, it may be necessary to remove or hollow out those portions of the 15 μm thick conductive structure 120 that have a lower, or relatively low, current flow. More specifically, the pair of load ends 126 are the areas of the conductive structure 120 in this example where the surface current flow is at its lowest. These are areas of top load, which strengthen broadband. As such, a plurality of portions 128 may be removed from, or hollowed out of, the pair of load ends 126. Removing these portions of the top load areas from the pair of load ends 126 reduces the volume of the conductive structure 120 (b) in the present example to approximately 5.44 $mm^3$ and an area of 363 $mm^2$, with relatively minimal impact on RFID performance with the correct design. Therefore, the hollowing out or removing of portions 128 has an effect of maintaining or improving broadband width, while decreasing overall antenna size requirements. Unfortunately, this volume is also still above the detection threshold for the metal detector, and will likely result in the generation of false positive readings by metal detector 30.

However, also reducing the thickness of the conductive structure 120 (b) to approximately 1 μm thick aluminum with an area of 363 $mm^2$, with the pair of load ends 126 having the plurality of hollowed out portions 128, further reduces the volume to approximately 0.36 $mm^3$, which is below the detection threshold of metal detector 30. A further reduction to a thickness of 500 nm has the effect of reducing volume to approximately 0.18 $mm^3$. While the conductive structure 120 may be manufactured by printing a conductive ink based on, for example, copper, silver, or graphene, cutting a metallic foil by a rotary cutting system, or a laser, or by etching, it may also be achieved at smaller thicknesses by vapor deposition.

In an additional contemplated embodiment, a RFID device 100 for use with food product items contains a RFID chip 110 and a conductive structure 120 electrically coupled to the RFID chip 110. The conductive structure 120 contains a tuning loop 122 and a pair of dipole arms 124. Each of the dipole arms 124 extend outwardly from the tuning loop 122 in generally opposite directions and terminate in a load end 126. Each load end 126 is an area of top load for the conductive structure 120, and the conductive structure 120 is manufactured to have a metallic mass below a standard detection threshold of a metal detector 30, of the type commonly used in the food production industry.

Additionally, the conductive structure 120 is configured so as to have an overall thickness that is ideally slightly greater than a skin depth 130 for the conductive structure material and frequency. Based on a standard detection threshold commonly used to scan food product items for foreign metallic objects, the conductive structure 120 will ideally have a total metallic volume of 0.52 $mm^3$ or less. To achieve such a low volume, portions of the conductive structure 120 having lower or relatively low current flow, and that have minimal effect on RF performance, are removed or hollowed out, such as portions of the pair of load ends 126. More specifically, each load end 126 is hollowed out to create a plurality of openings or portions 128 within the load ends 126.

Alternative technologies for detecting foreign metallic objects include x-ray analysis, and the like. As previously stated, in some embodiments, the RFID device 100 described herein is manufactured with a reduced mass that is spread out throughout the conductive structure 120. As such, the RFID device 100 will not produce a high density "lump", and should produce a relatively diffuse image on x-ray. More specifically, the relatively diffuse image will not block or obstruct detection of high-density materials, such as foreign metal objects, as the RFID device 100 will be relatively "transparent." Ideal materials for the conductive structure 120 for the x-ray application are materials with a relatively low density including, but not limited to, graphene (2.267 $g/cm^3$), aluminum (2.7 $g/cm^3$), and copper (8.96 $g/cm^3$). Therefore, it would be advantageous to construct the conductive structure 120 from a low density, high conductivity material such as, aluminum or graphene for x-ray applications. Metal detection is better related to conductivity. Whereas aluminum is a good choice, graphene, copper, and silver are better conductors. Furthermore, an additional benefit to the low metallic volume is that the RFID device 100 will ideally be "microwave safe." More specifically, the RFID device described herein may also reduce or eliminate the sparking risks associated with using a microwave to cook a food product with an RFID device attached thereto by eliminating or removing, such as by hollowing out, a portion of the metal conductive structure of the RFID device.

Figure 6:
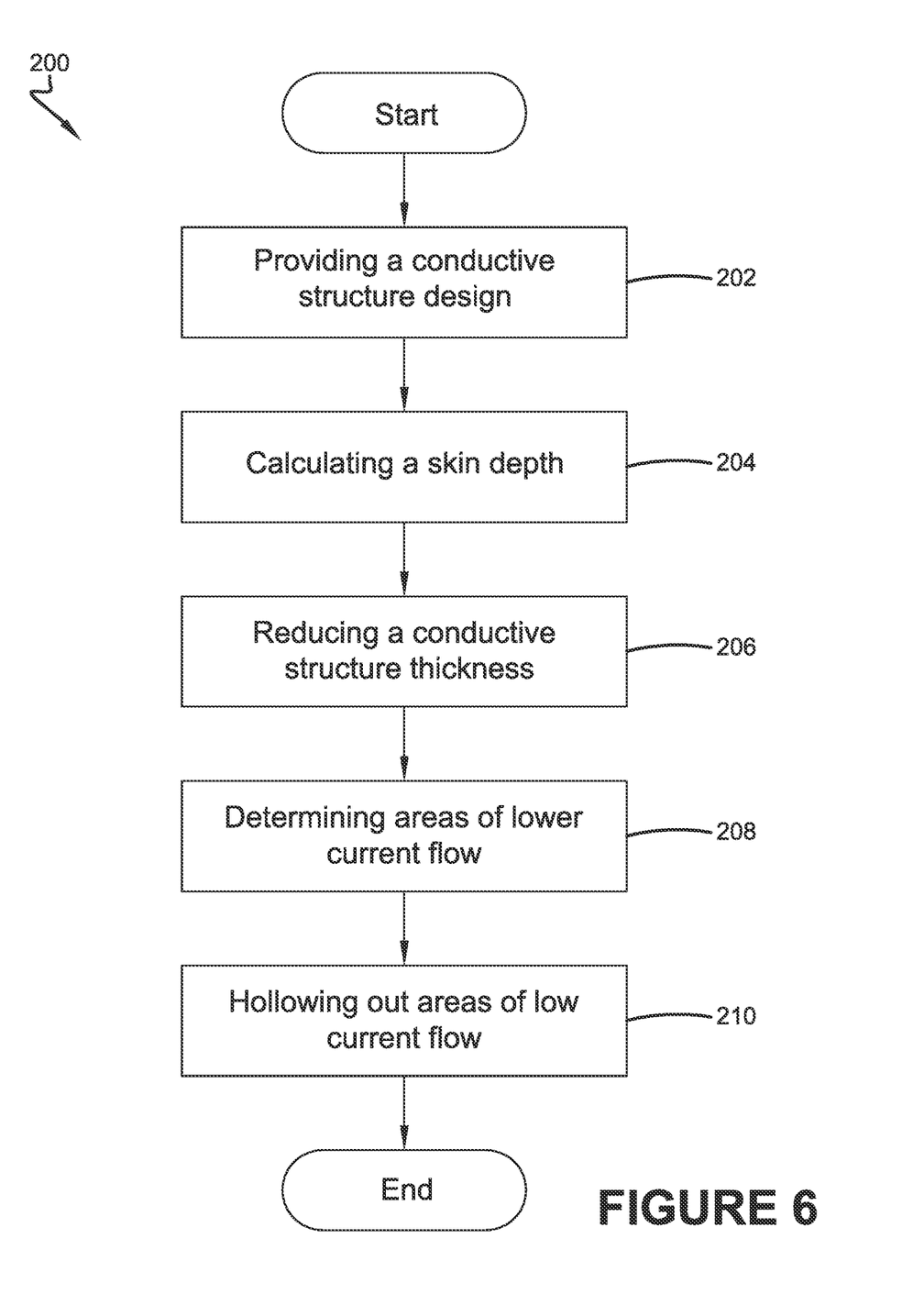
FIG. 6 illustrates a method of reducing a mass of a conductive structure for use with an RFID device in accordance with the disclosed architecture.

FIG. 6 illustrates a method of reducing the metallic mass of a conductive structure 120 of RFID device 100. More specifically, the method 200 begins at step 202 by providing a conductive structure 120 having an initial area and volume just large enough to adequately perform RFID functions in accordance with a user's specifications. At step 204, a skin depth 130 may be calculated based on the conductive structure's material and frequency as described supra, and, at step 206, the method continues as an overall initial thickness of the conductive structure 120 is reduced in one of the manners described above to achieve the profile depicted in FIG. 4B. Typically, the reduced thickness of the conductive structure 120 should not be less than the calculated skin depth 130 for the conductive structure's specific material and frequency.

At step 208, areas of reduced current flow along the conductive structure 120 that will have little to no impact on the performance of conductive structure 120 and RFID device 100 are identified. In some embodiments, the specific areas of the conductive structure 120 where current flow is low are located on a pair of load ends 126 of the conductive structure 120. Therefore, in step 210, the portions 128 of the conductive structure 120 where current flow is low are hollowed out to reduce the overall metallic mass of conductive structure 120 and RFID device 100. Removing this metal mass reduced the overall area of the conductive structure 120 as much as possible without significantly affecting the performance of the RFID device 100. The methods described herein provide an optimal solution for a design of the conductive structure 120 that provides the required performance and that is suitable for use with a food product 10 or its packaging 20, and metal detector 30.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A metal detector-resistant Radio Frequency Identification (RFID) device comprising:
   an RFID chip; and
   a conductive structure electrically coupled to the RFID chip, wherein the conductive structure has a metallic mass that is below a standard detection threshold, and wherein an overall thickness of the conductive structure is greater than a skin depth for the conductive structure.

2. The RFID device of claim 1, wherein the conductive structure comprises a pair of dipole arms extending oppositely from a tuning loop, and further wherein each of said pair of dipole arms terminates in a load end.

3. The RFID device of claim 2, wherein each load end is hollowed out.

4. The RFID device of claim 1, wherein a portion of the conductive structure has a lower current flow than a second portion of the conductive structure and the first portion is removed.

5. The RFID device of claim 1, wherein the RFID device does not block detection of high-density materials when x-rayed.

6. The RFID device of claim 1, wherein the standard detection threshold is a total metallic volume of 0.52 $mm^3$ or greater.

7. A method of reducing a metallic mass of a Radio Frequency Identification (RFID) device comprising:
   providing a conductive structure;
   reducing a thickness of the conductive structure to achieve a reduced thickness; and
   hollowing out a portion of the conductive structure,
   wherein a current flow of the portion is less than the current flow of a second portion of the conductive structure.

8. The method of claim 7, further comprising a step of calculating a skin depth of the conductive structure.

9. The method of claim 7, wherein the reduced thickness is not less than the skin depth of the conductive structure.

10. The method of claim 7, wherein the conductive structure comprises a pair of dipole arms extending from a tuning loop and terminating in a load end.

11. The method of claim 7, wherein the portion is located on at least one of a pair of load ends of the conductive structure.

12. A conductive structure for use with a Radio Frequency Identification (RFID) device that will be subject to a metal detector having a standard detection threshold,
   wherein the conductive structure has a metallic mass that is below the standard detection threshold and is electrically coupled to the RFID device, and wherein an overall thickness of the conductive structure is greater than a skin depth for the conductive structure.

13. The conductive structure of claim 12, wherein the standard detection threshold is a 1 mm diameter metal sphere.

14. The conductive structure of claim 12, wherein the standard detection threshold is a total metallic volume of 0.52 $mm^3$ or greater.

15. The conductive structure of claim 12, wherein the conductive structure comprises aluminum.

16. The conductive structure of claim 12, wherein a portion of the conductive structure is removed.

17. The conductive structure of claim 12, wherein a conductive structure thickness is achieved by vapor deposition.

18. The conductive structure of claim 12, wherein the conductive structure is manufactured by either printing a conductive ink or by cutting a foil.

* * * * *